Sept. 28, 1926.                                             1,601,011
P. VIVIANO
WEIGHING SCALE
Filed April 1, 1926
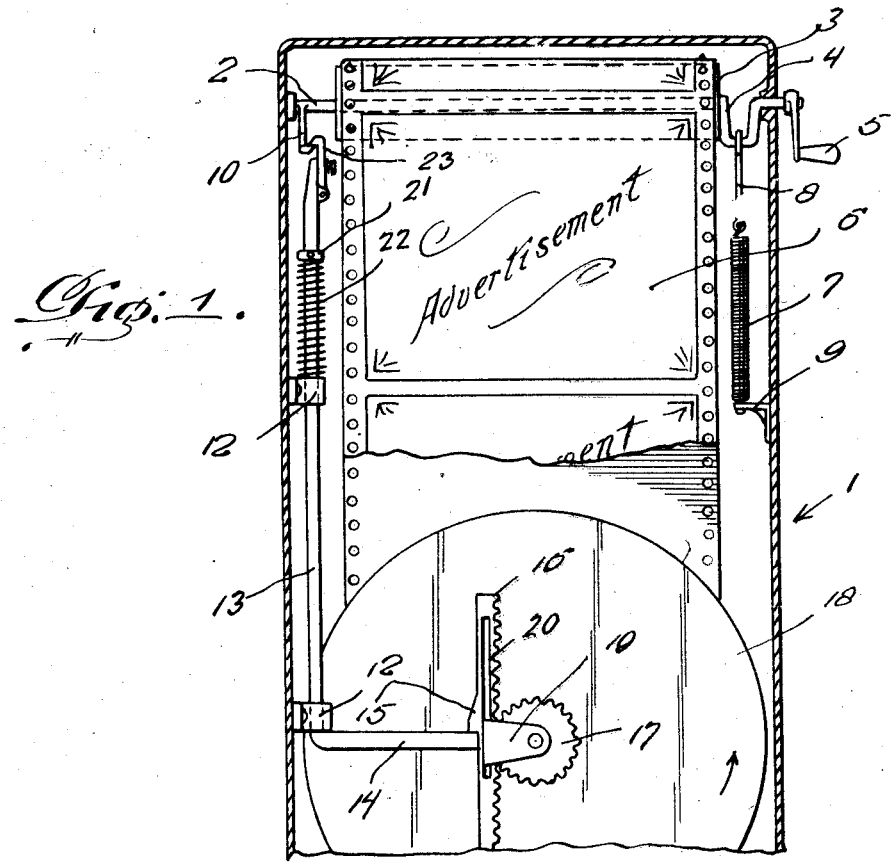
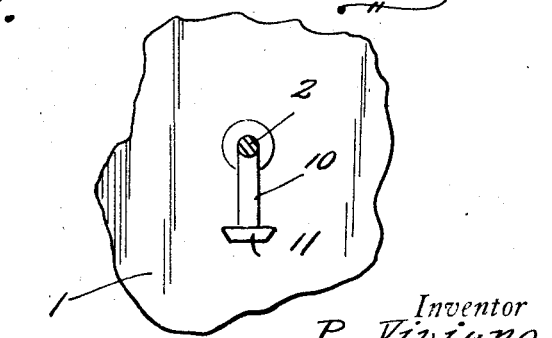
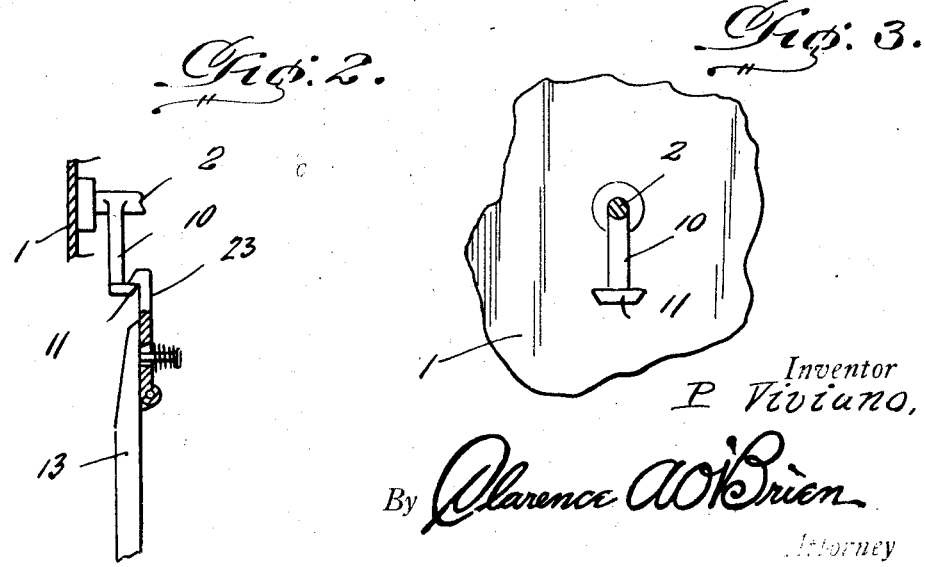
Inventor
P. Viviano,
By Clarence A. O'Brien
Attorney Patented Sept. 28, 1926.

1,601,011

UNITED STATES PATENT OFFICE.

PHILIP VIVIANO, OF ST. LOUIS, MISSOURI.

WEIGHING SCALE.

Application filed April 1, 1926. Serial No. 99,057.

This invention relates to an improved weighing scale, and it has more particular reference to advertising means to be used in association with the scale.

Briefly, the invention has reference to a scale structure wherein the standard is in the form of a vertically elongated casing of substantially rectangular form, this casing being provided on its interior with drums over which an advertising band passes. The front of the casing is formed with an opening through which the advertising spaces or areas on the band are successively displayed. In the casing is a rotatably mounted weight indicating disc which is operated from a tiltable platform through the medium of rack and pinion means. Manually operated means is provided and disposed on the exterior of the standard for rotating the upper drum to operate the advertising band. Then there is a novel means between the shaft of the upper drum and the rack bar for controlling the action of the rack and pinion.

The principal object is to provide an especially constructed device between the shaft of the upper drum and the rack bar so that the rack bars cannot be operated until the drum is turned to a set position by a hand crank, thereby making it compulsory to turn the drum to change the advertising space in order to permit operation of the weight indicating disc.

The features and advantages of the particular construction employed will become more readily apparent from the following description and drawing.

In the accompanying drawing forming a part of this application and in which like numerals are employed to designate like parts throughout the same:

Figure 1 is a fragmentary view in section and elevation showing a part of the scale constructed in accordance with this invention.

Figure 2 is a detail view showing latch mechanism.

Figure 3 is an enlarged view of a part of the latch mechanism.

Before proceeding with the detailed description, attention is called to the fact that the present invention embodies features of construction shown in Patent No. 1,570,872 granted to me on January 26th, 1926, and a copending application Serial No. 52,806 filed by me on August 27th, 1925. It is believed that reference should be had to these patents before considering the present case.

Referring to the drawings and particular to Figure 1 it will be seen that the reference character 1 designates generally the vertical portion of a casing or weighing scale standard. This is of general rectangular configuration. Mounted in the top of the casing on a shaft 2 is a rotary drum 3. At one end of the shaft a crank 4 is formed and has its end portion disposed on the exterior of the casing to accommodate a handle 5 by means of which the drum and shaft are rotated. Trained over this drum and also over a similar drum (not shown in the modification) is an endless advertising band divided into a plurality of advertising areas or spaces 6. A coiled spring 7 is connected by a link 8 to the crank 4 and is then connected with a stationary bracket 9 and serves to maintain an advertising space 6 in proper position for display. By referring to previous patents it will be seen that the casing is provided at a predetermined point with an opening or window with which this advertising space is adapted to register so that when a person stands on the platform of the scale, they can view the advertisement through the window. At the opposite end of the shaft is a depending arm 10 terminating in a head 11.

Mounted in guides 12 at a point below the shaft and arm is a reciprocating control rod 13 having its lower end portion 14 directed at right angles and engage beneath a shoulder 15 on a toothed rack bar 16. The teeth of this bar mesh with the teeth of a rotary pinion 17 which serves to impart rotation to a rotary weight indicating disc 18.

At this time I would state that in practice the periphery of this disc 18 is provided with weight indicating numbers which are displayed in an appropriate manner. Moreover the lower end portion of the rack bar 16 is connected with a tiltable platform forming a part of the base of the scale structure, and when this platform is tilted downwardly under the weight of the person, the rack bar is moved downwardly to rotate the pinion and to in turn rotate the weight indicating disc. It will be noted that a yoke 19 is associated with the pinion 17 and has its bight portion confined in a slot 20 in the rack bar.

Referring now to the upper portion of the control rod 13 it will be seen that a collar 21 is carried thereby and a coiled spring 22 surrounds the rod between the collar and the uppermost guide 12. Then by directing attention to Figure 2 it will be seen that the spring pressed latch 23 is carried by the upper end of this rod and is adapted to be engaged with the head 11 on the arm 10 to maintain the rod 13 in the position shown to prevent downward movement of the rack bar 16 and consequent operation of the scale indicating means.

In accordance with this invention it is compulsory in order to permit operation of the indicating disc 18 to release the rack and pinion mechanism. To do this the person standing on the scale must necessarily turn the hand crank 5. In so doing the rotary drum 3 at the top will be rotated and this will disengage the head 10 from the latch 23, thus letting the control rod 13 move downwardly with the rack bar and to permit consequent operation of the indicating disc. According to the instructions, the hand crank will have to be turned a complete revolution and in so doing, a new advertising space 6 will be brought up for display purposes. In this way a full benefit of the advertising medium will be obtained. The spring means will reset the latch, and the latch will be reengaged with the head 11 after the latter has been returned to its normal position by a full rotation of the drum.

It is believed that the advantages and features of construction of an invention of this kind will be clear to those skilled in the art to which the invention relates after considering the description in connection with the drawing, therefore a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. In a structure of the class described, in combination, a casing, a drum rotatably mounted in said casing, an advertising band trained over said drum, a weight indicating means in said casing, operating means for said weight indicating means, and a control device cooperable with said drum and said operating means, whereby it is necessary to move the drum to predetermined position to permit said operating means to operate.

2. In a structure of the class described, a vertically elongated casing, a shaft rotatable in bearing in said casing, manually operable means for rotating said shaft, a drum mounted on said shaft, an advertising band trained over said drum, an indicating disc mounted for rotation in said casing, operating means for said disc, and a control device cooperable with said shaft and with said operating means.

3. In a weighing scale structure of the class described, a casing, a shaft mounted for rotation with said bearings in said casing, a drum on said shaft, and an advertising band trained over said drum, a hand crank for rotating said shaft, means for maintaining said shaft in a normal position, a rotary indicating disc, rack and pinion means cooperable with said disc for operating it, and a control device between said shaft and said rack and pinion means, said control device including a slidably mounted rod, a latch mechanism cooperable therewith and with said shaft.

In testimony whereof I affix my signature.

PHILIP VIVIANO.